United States Patent Office 3,499,784
Patented Mar. 10, 1970

3,499,784
PROCESS FOR RENDERING POWDERS FREE FLOWING AND THE THUS OBTAINED POWDERS
Svend Asger Rud Bentholm, Nuland, Hendrik Hoogendoorn, Vlaardingen, Elkan Joachim de Jong, Rotterdam, and Wilhelm Engelinus Koenen and Jacobus Polderman, Oss, Netherlands, assignors to Organon Inc., West Orange, N.J., a corporation of New Jersey
No Drawing. Filed Nov. 24, 1965, Ser. No. 509,602
Claims priority, application Netherlands, Dec. 4, 1964, 6414091
Int. Cl. B05c 3/00; B44d 1/02
U.S. Cl. 117—100                                                10 Claims

ABSTRACT OF THE DISCLOSURE

Finely divided solid substances or powders are rendered free flowing without altering the original particle size, in a two-step process which comprises (a) mixing the powder with a small amount of a solution of a coating material to obtain a moist non-coherent and non-homogeneous mass, and (b) passing it through a continuous grinder to completely homogenize said mass, both steps being performed without substantially altering the particle size of the substance. The process can be applied to medicinal substances, cleansers, fertilizers, catalysts, pesticides, foodstuffs, sweeteners, molding powders, and the like.

---

The invention relates to a process for rendering finely divided solid substances or powders free flowing, which substances excel in perfect manageability compared with non-treated substances.

It is known that many solid substances become less manageable in proportion as the particles are smaller. Finely divided, they tend to clot together or agglomerate into clots, caused in some cases by electrostatic charges occasioned by, for instance, grinding. The adsorbing properties of the surface of the particles, too, may play an important part. As a result these powders are less readily miscible with other powdery substances and mechanically difficult to dose and disperse in liquids. In all cases in which finely divided powders have to be handled, such as in the manufacture or processing of medicines, foodstuffs, pesticides, washing and cleansing agents, fertilizers, catalysts and press powders for the manufacture of moulded products, to mention but a few widely divergent branches of industry, bad manageability means an impediment in the processing and/or application.

It has been tried in various ways to avoid this obstacle. Mostly coarse grains are made of the fine powder, for instance with a granulating roller. The manageability then will improve of course, but at the cost of the powdery nature of the substance. Further the process of spray-drying, for instance in the drug and food industry, is applied. A solution or suspension of a substance is atomized in a dry stream of air to form a finely divided powder consisting of minute globules. But this method requires much energy and special devices, so that application is hardly justifiable in case of high-grade substances or the products prepared thereof. Other methods to render certain powders free flowing are also known. For example the Canadian Patent No. 678,179 describes the preparation of a powdery non-granulated tableting mass containing a medicine, which mass can be pressed immediately into tablets. The powder has been rendered free flowing by mixing the medicine with at least 20% by weight of calcium salts of phosphoric acid. Further it is known from German Patent No. 1,164,023 that by mixing a powdery tableting mass with at most 0.1% of microfine silicic acid gel the powder is rendered more free flowing, so that a more even distribution over the matrixes is obtained. German Patent No. 928,804 describes a free flowing sprinkling powder for human or animal skin, prepared by mixing an insoluble inorganic salt, for example talc, with a small quantity of a salt, obtained for example by the conversion of an acid calcium phosphate with sulphuric acid.

Surprisingly a universal, simple method has now been found to render finely divided solid substances free flowing, comprising the steps of (a) mixing a finely divided solid substance with a small amount of a liquid containing a coating material for said substance sufficient to convert said substance into a moist non-coherent and non-homogeneous mass and (b) substantially completely homogenizing said mass in a grinder for continuous use.

Sometimes it is required to dry the completely homogenized mass and to sieve it, if desirable.

In this process of the invention a distinction is made between a rough pre-mixing of the particles with coating material as first treatment and a very intensive mixing or homogenization as second one.

The first step which is characterized by the use of such a small quantity of liquid that a moist non-coherent mass is formed, may be performed successfully in the conventional mixers. But these devices are incapable of complete mixing owing to the relatively small quantity of liquid used. Hence the final product of this first phase of the treatment is a non-homogeneous mass, which may contain a few lumps. This method of mixing must be clearly distinguished from methods consisting of either kneading, so that the formed agglomerates must be separated again to prepare a powdery mass, or the application of so much liquid that a continuously liquid phase is formed. In the latter case mixing is a simple operation, but the removal of the liquid requires a separate treatment, for instance drying by atomization.

The second step is characterized by a substantially complete homogenization of the non-homogeneous mass obtained in the first treatment. It is performed in grinders for continuous use. These devices, chiefly belonging to the hammer mill type, are capable of mixing the moist granular mass of the first treatment in such a manner that each particle and each lump is triturated as it were, without the formation of new lumps, so that after drying of the mass a fine granulous free flowing powder is formed. It was surprising and unexpected to see that the mass obtained after the pre-mixing undergoes such a change by a short treatment in a grinder that a free flowing powder is obtained, if required after drying.

If such a quantity of liquid is used that coherence does occur, a granulate is formed which is also free flowing, but cannot be used in many cases owing to the coarseness of the particles.

Preferably a rise in the temperature is avoided in the second treatment, otherwise evaporation of moisture occurs with condensation in cooler places, rendering homogeneous mixing difficult. Although the process according to the invention is not restricted to particles of a certain size, the best results are obtained by starting from particles not larger than about 200 micron.

As examples of coating materials there are mentioned carbohydrates, such as starch, amylopectin, soluble starch, cellulose and derivatives thereof, such as methyl cellulose, ethyl cellulose, hydroxyethyl cellulose, ethylhydroxyethyl cellulose, sodium carboxymethyl cellulose, further polyvinyl pyrrolidon, gelatin, alginic acid, polysaccharides, natural gums, for example guar gum, aragic gum, tragacanth, natural and artificial resins, such as shellac, zein, colophonium, polyvinyl and polyacryl resins and derivatives thereof, and Carbowaxes (polyethylene glycols), which materials may be used separatedly or in admixture. The choice of the coating material to be used depends on the nature and the use of the powder to be treated. It should be inert in relation to the powder and also stable. Preferably no hygroscopic material will be used, because if exposed to the air, it may cause the particles to stick together. By preference water-soluble coating material is used. The quantity of coating material is not critical. In general 0.1–5% by weight and preferably 0.1–2% relating to the quantity of powder to be treated is used. Mostly 0.3–0.5% is sufficient. It is clear that this percentage depends more or less on the dimension and the properties of the surface of the powder and the properties of the coating material.

The selection of the diluent or solvent depends on the coating material, which must be soluble in it or at least swellable, but on the powder to be coated, which must be moistened by the liquid, but must preferably not be soluble in it. For economical reasons water is mostly applied, but also alcohols, ethers, ketones, halogen hydrocarbons and other preferably polar solvents or mixtures thereof can be used. A volatile solvent has the advantage that it can easily be removed from the powder treated. It is in any case essential that the liquid can be removed by evaporation.

The coating material is preferably dissolved in the liquid to a concentration of about 2–30%. However, the powder may also be mixed with the dry, finely divided coating material, after which the desired quantity of liquid can be added to it. But in this manner it will take some time before the coating material is dissolved or at least swollen in the liquid. Mostly a quantity of from about 1% to 10% by weight of liquid will be sufficient. When use is made of a strongly water-absorbing powder, this quantity may be appreciably greater. By first dissolving or suspending in the coating material small quantities of strongly active additions, they can be mixed homogeneously with the powder to be treated by the process according to the invention together with the coating material and without any further treatment by which a constant homogeneous division is assured.

The pre-mixing of the powder and the coating material can take place in conventional mixing devices.

For example a planetary mixing device of the Hobart type can be used. Further mixing devices fitted with agitators of the Nauta, Lödige and Stephan type and devices with a Z-shaped mixing arm can be used.

The second treatment, the homogenization, can excellently be performed in hammer mills working continuously, and capable of homogenizing in a very short time the mixture obtained after the first treatment, and having a large capacity. For preference a Fitzpatrick hammer mill, a Stokes Tornado hammer mill, an Apex hammer mill, or a Peppink hammer mill can be used. The duration of the treatment in these mills takes only a few seconds. By this treatment the agglomerates present are rendered small and the particle size becomes more uniform. A very favourable factor in this process is the very great capacity of these mills, so that in a short time large quantities of powder can be treated.

The hammer mills are fitted with a sieve or sieving plate through which the sufficiently ground material is removed in case of normal use, i.e. as a grinding device for dry substances. When use is made of the mills according to the invention, hence as a device for homogenization, the sieve has chiefly another function. It serves to regulate the residence time of the mass to be homogenized in the grinding chamber. This must be short. The size of the meshes should be such that they do not get stopped up. This is usually the case with a size of at least 2 mm. and preferably about 4 mm. The size of the particles is not proportional to the size of the meshes. In some cases the sieve may even be omitted, after which the treatment must often be repeated, however, to obtain the desired final product.

By means of colouring matter which may be added to the coating material it may be observed clearly after homogenization and drying of the powder that a homogeneous division of the coating material over the powder has taken place. Differently coloured grains possibly still present in the mass obtained after the first mixing, have disappeared in the ultimately obtained free flowing powder.

It is clear that the invention also comprises the treatment of a mixture of substances by which a stable combination is generally obtained.

The powders obtained are dried in a conventional manner, for example in a fluidizer or by spreading them in a thin layer and passing over it a heated dry air stream or in vacuo with slight heating. A suitable temperature for this purpose is for example between 30° and 60° C. Drying may be omitted if the powders obtained after homogenization are mixed with an absorbing powder.

By combination of the two steps described a free flowing powder is obtained, if necessary after drying and sieving, which powder, unlike the non-treated powder, does not clot or stick together to form larger agglomerates and may easily be dispersed in aqueous liquids, dependent on the coating material. It is very readily miscible with other powdery solid substances and can well be dosed mechanically; in short, it is surprisingly easily manageable and is therefore suitable for many uses. Especially for slightly soluble or non-water-soluble substances the present process has a great advantage.

Many organic substances, such as for instance medicines and pesticidees used in agriculture, are hydrophobic, hence they cannot be easily moistened with and dispersed in aqueous liquids, so that when use is made of these substances in a finely divided form, often very special provisions will be required, for instance application of surface active substances. By the process according to the invention it is possible by the application of a coating layer of a water-soluble, non-ionogenous cellulose derivative, for instance methyl cellulose, to the particles of a hydrophobic substance to mask the hydrophobic property thereof completely, rendering it suitable for the preparation of homogeneous, aqueous dispersions, which is of great advantage for various uses.

The thus obtained coated substance greatly differs from the substances treated with surface active compounds, for instance of the sodium lauryl sulphate type, quaternary ammonium compounds and polyoxyalkylene sorbitan esters of higher fatty acids. Those substances may then be moistened with water it is true, but they are difficult to disperse in it. Moreover they are not free flowing as a rule as the coated substances of the invention. An additional advantage of the invention is that the volume often decreases, especially if the original powder contains much air. The present process may also be of advantage when very hydrophilic substances are required to be made less hydrophilic. The results of the process according to the invention are excellently reproducible.

Instead of treating the active substance by this process, it is also possible ot treat one or more of the auxiliaries to be mixed with it by the process of the invention, whereupon the powder obtained can be mixed with the active substance by which the entire mixture gets the property of a free flowing powder. It has been found that for that purpose for example 30% by weight or more of treated auxiliaries must be used dependent on the nature and the surface of the active substance and the auxiliaries. As an example of an auxiliary particularly suitable for such a mixture with medicines there are mentioned lactose and $CaSO_4 \cdot 2H_2O$.

The free flowing powders of this invention are extremely suitable for tableting and capsuling. For owing to their free flowing nature they can be excellently mixed with filling substances, lubricants and other auxiliaries required for the preparation of moulded products. Moreover they can be very easily dosed mechanically, and they can fill the matrixes of a press very evenly.

Examples of substances which may be treated suitably by the present process are medicine, such as phenacetin, acetylsalicylic acid, salicylamide, compounds to be used as antacids, such as aluminum hydroxide, calcium carbonate, basic bismuth nitrate, further citric acid, digoxin, sulphur, ferrofumarate, sulfanilamide, sodium p-aminosalicylate, raubasin, caffeine, powders prepared from organs and extracts thereof, such as thyroid powder, liver powder, pancreas powder and pylorus powder, further yeast powder, antibiotics, such as chloroamphenicol, procane-penicillin, tetracycline, and dyes, sweetening agents, such as sodium cyclamate, saccharose, maltose and sorbitol. Further the invention is of importance for numerous other substances, such as pesticides, catalysts, foodstuffs, for example sodium glutamate and other substances for soups, fine salt, spices or mixtures thereof, for powders of washing and cleansing agents, further antiseptics and compounds used as fertilizers.

EXAMPLE 1

Tartaric acid.—Ten kg. of finely powdered tartaric acid were first mixed in a Stephan mixer with a solution of 50 gm. of methyl cellulose in 1,340 gm. of dichloromethane and 660 gm. of methanol. After homogenization a free flowing powder was obtained particularly suitable for use in for example the foodstuff industry.

EXAMPLE 2

Acetosal.—Ten kg. of micronized acetosal were mixed in a Lödige mixer with a solution of 30 gm. of methyl cellulose, for instance Tylose MH 50 (Kalle) in 1000 ml. of water. The obtained moist mass was passed through a Stokes Tornado mill, next dried in vacuo at 45° C. and sieved. The obtained free flowing powder was pressed into tablets after mixing with 1000 gm. of starch.

EXAMPLE 3

Fenacetin.—Twenty kg. of finely ground fenacetin were mixed in a kneading machine with a Z-shaped mixing arm with a solution of 100 gm. of hydroxyethyl cellulose in 1500 ml. of water. Next the thus obtained moist mass was passed through a Peppink mill and after that dried and sieved to obtain a free flowing and hydrophilic powder.

EXAMPLE 4

Antacidum.—In a Nauta mixer were mixed dry: 800 gm., of dried aluminum hydroxide gel, 1000 gm. of calcium carbonate, 550 gm. of magnesium carbonate, 1400 gm. of magnesium trisilicate, 400 gm. of oatmeal and 250 gm. of guar gum serving as a binding agent. Next the mixture was moistened with a mixture of 2000 ml. of ethanol and 2000 ml. of water. During mixing the binding agent dissolved in it. Next the obtained moist mass was passed through a Fitzpatrick mill, dried in vacuo at 35° C. and finally sieved. The product obtained was a free flowing powder which after mixing with for instance potato starch, magnesium stearate and taste corrigents, could be pressed into tablets.

EXAMPLE 5

Salicylamide.—Mixed in a finely ground form were: 2000 gm. of salicylamide, the same amount in weight of phenacetin, 250 gm. of caffeine, 180 gm. of lactose, 600 gm. of talc and 900 gm. of potato starch with 18 gm. of methyl cellulose and 420 ml. of water in a Nauta mixer. Next the obtained mass was passed through a hammer mill, whereupon the powder was dried and sieved. The thus obtained free flowing powder can be used as such or pressed into tablets.

EXAMPLE 6

Sweetening agent.—Three kg. of sodium cyclamate were mixed in a Lödige mixer with 7 kg. of lactose and next with 50 gm. of methyl cellulose in 200 ml. of water. The obtained moist mass was passed through a hammer mill with a sieve with 4 mm. meshes and yielded after drying in vacuo at 40° C. and sieving a free flowing powder.

EXAMPLE 7

Antibiotic.—One thousand gm. of chloroamphenicol were mixed with 5 gm. of methyl cellulose, dissolved in 95 gm. of water in a Stephan mixer. Next the moist grainy mass was passed through a Stokes Tornado mill and subsequently dried and sieved to obtain a free flowing powder which can be easily passed into capsules and can be dispersed readily in water.

In the same manner it is also possible for instance to prepare free flowing powders and, if desired, tablets that may be dispersed in water fom other hydrophobic substances, such as iodochloro-oxyquinoline.

EXAMPLE 8

Filling substance.—Two thousand gm. of calcium sulfate $2H_2O$ were mixed in a Stephan mixer with a solution of 20 gm. of methyl cellulose in 400 ml. of water. Next the mass formed was passed through a Fitzpatrick mill, dried and sieved to obtain a free flowing powder which, for example, is very suitable as a filling substance for tablets.

EXAMPLE 9

Fungicide.—Two thousand five hundred gm. of tetramethylthiuramdisulfide were mixed in a Lödige mixer with 25 gm. of methyl cellulose dissolved in 500 ml. of water. Next the mixture obtained was led through a Stokes Tornado mill and dried to obtain a free flowing and hydrophilic powder.

EXAMPLE 10

Herbicide.—One thousand gm. of 2–Cl–4,6-bis (ethylamino) triazol were mixed in the same manner as in Example 9 with 10 gm. of methyl cellulose in 440 gm. of water and homogenized to obtain a free flowing powder; the hydrophobic property of the original substance had for the greater part disappeared.

EXAMPLE 11

Sulphur.—In the same manner as described above 1000 gm. of precipitated sulphur were mixed with 5 gm. of methyl cellulose in 133 ml. of water and homogenized. In this manner the highly hydrophobic substance was converted into a free flowing hydrophilic powder.

EXAMPLE 12

Insecticide.—Fifteen hundred gm. of DDT powder were mixed in a Stephan mixer with 15 gm. of methyl cellulose and 225 gm. of water. The formed non-homogeneous mass was next homogenized in a Fitzpatrick mill and yielded after drying a free flowing powder that could be readily suspended in water.

EXAMPLE 13

Washing powder component.—Three thousand gm. of neutral sodium pyrophosphate were mixed in a Stephan mixer with a solution of 90 gm. of carboxymethylcellulose in 1700 ml. of water and next passed through a Fitzpatrick mill, dried and sieved. The free flowing powder obtained could even be mixed with double the quantity by weight of sodium sulphate and acid sodium pyrophosphate, also washing powder components, after which the whole mixture has become free flowing and extremely suitable for further treatment.

EXAMPLE 14

Washing powder component.—Three thousand gm. of a powdery mixture, consisting of 1350 gm. of sodium sulphate, 900 gm. of neutral sodium pyrophosphate, 450 gm. of acid sodium pyrophosphate and 300 gm. of carboxymethyl cellulose were mixed in a Nauta mixer with 30 gm. of ethyl cellulose in 360 ml. of 96% alcohol and next passed through a Stokes Tornado mill. After drying and sieving a free flowing and hydrophobic powder was obtained which was readily miscible with other washing components.

EXAMPLE 15

Insecticide.—Ten kg. of 1-naphthyl-N-methylcarbamate were mixed in a Hobart mixer with 100 gm. of methyl cellulose in 4 l. of water. The mixture obtained was passed through a Peppink mill and finally dried to obtain a free flowing and hydrophilic powder.

EXAMPLE 16

Vulcanisation accelerator.—One thousand gm. of zinc salt of dimethyl dithiocarbamate were mixed in a Stephan mixer with 10 gm. of methyl cellulose dissolved in 100 ml. of water and next homogenized in a Peppink mill with a sieve with 5 mm. meshes. The powder obtained was free flowing.

EXAMPLE 17

Medicine against leprosy.—Five hundred gm. of p.p' sulfonyl-dianiline were mixed in a Hobart mixer with a solution of 2.5 gm. of methyl cellulose in 100 ml. of water and passed through a Fitzpatrick mill to obtain a free flowing and hydrophilic powder that can be very easily tableted.

What is claimed is:
1. Process for rendering a finely divided substance, the particles of which have a tendency to clot, free flowing, comprising the steps of:
   (a) pre-mixing the particles of said finely divided solid substance with a liquid diluent containing a coating material for said substance in an amount sufficient to convert said substance into a moist, non-coherent and non-homogeneous lumpy or granular mass;
   (b) substantially completely homogenizing said lumpy or granular mass by intensive mixing in a continuous grinder for a period of time of the order of a few seconds, sufficient to eliminate the lumps or granules formed in step (a) but insufficient to permit formation of additional lumps or granules; and
   (c) drying said homogenized mass to form a free flowing powder.

2. The process of claim 1 in which the particles of finely divided substance pre-mixed in step (a) have a particle size not larger than about 200 microns.
3. The process of claim 1 in which the amount of coating material is between about 0.1% and about 2% by weight of said solid substance.
4. The process of claim 1 in which the amount of liquid is from about 1% to about 10% by weight of said solid substance.
5. The process of claim 1 in which said liquid is a polar solvent.
6. The process of claim 1 in which the solid substance is a medicine.
7. The process of claim 1 in which the coating material is methyl cellulose.
8. The process of claim 1 in which the liquid is water.
9. The process of claim 1 in which said continuous grinder is a hammer mill with meshes of at least 2 mm.
10. A free flowing powder prepared from a finely divided solid substance according to claim 1.

References Cited

UNITED STATES PATENTS

| | | | |
|---|---|---|---|
| 3,034,858 | 5/1962 | Vives | 117—100 |
| 3,202,731 | 8/1965 | Grevenstuk | 117—100 |
| 3,300,332 | 1/1967 | Gorham | 117—100 |
| 3,301,636 | 1/1967 | Otrhalek | 117—100 |
| 3,350,306 | 10/1967 | Alleton | 117—100 |
| 3,392,139 | 7/1968 | Dingman | 117—100 |
| 1,985,076 | 12/1934 | Breyer | 241—16 |
| 2,225,147 | 12/1940 | Bechtold | 241—16 |
| 2,662,028 | 12/1953 | Fenton | 241—16 |

FOREIGN PATENTS 1,049,636  11/1966  Great Britain.

ROBERT C. RIORDON, Primary Examiner

DONALD G. KELLY, Assistant Examiner

U.S. Cl. X.R.

241—16, 18